United States Patent [19]
Mitsuse

[11] Patent Number: 5,532,828
[45] Date of Patent: Jul. 2, 1996

[54] IMAGE FORMING APPARATUS WITH EDGE SMOOTHING

[75] Inventor: Toshihiko Mitsuse, Fukuoka, Japan

[73] Assignee: Matsushita Electric Industrial Co., Ltd., Osaka, Japan

[21] Appl. No.: 143,669

[22] Filed: Nov. 1, 1993

[30] Foreign Application Priority Data

Nov. 4, 1992 [JP] Japan .................................. 4-294680

[51] Int. Cl.⁶ ............................. H04N 1/21; H04N 1/23
[52] U.S. Cl. ........................ 358/298; 358/298; 347/183; 382/254; 348/625
[58] Field of Search ................................. 358/183, 188, 358/131, 298, 382, 443, 448, 455–59, 462; 347/183; 382/254, 258, 264, 266

[56] References Cited

U.S. PATENT DOCUMENTS

| | | | |
|---|---|---|---|
| 4,368,491 | 1/1983 | Saito | 358/283 |
| 4,544,922 | 11/1985 | Watanabe et al. | 340/728 |
| 4,847,641 | 7/1989 | Tung. | |
| 4,967,283 | 10/1990 | Uchiyama et al. | 358/296 |
| 5,021,937 | 6/1991 | Cohen | 363/41 |
| 5,438,437 | 8/1995 | Mizoguchi et al. | 358/518 |

FOREIGN PATENT DOCUMENTS 324674  2/1991  Japan .

Primary Examiner—Peter S. Wong
Assistant Examiner—Gregory J. Toatley, Jr.
Attorney, Agent, or Firm—Lowe, Price, LeBlanc & Becker

[57] ABSTRACT

An image forming apparatus includes a dot forming unit responsive to a drive signal for forming a dot on a pixel when the drive signal is indicative of forming the dot to reproduce a halftone image. The apparatus further includes a drive signal generation circuit for generating the drive signal according to a video density signal, a deletion signal, an addition signal, and a directional signal. The deletion signal indicates that the video density signal of the pixel shows a shadow level and there is a first edge adjacent to the pixel in a first image around the pixel. The addition signal indicates that the video density signal of the pixel shows a highlight level and there is a second edge adjacent to the pixel in a second image around while the pixel, the directional signal indicates a direction of the first and second edges from the pixel. The drive signal is pulse-modulated by the video density signal. When the addition signal indicates an addition mode, a small dot is added at one of side portions of the pixel according to the directional signal. When the deletion signal indicates a deletion mode, one of side portions of dot which would be formed according to said video density signal is deleted according to the directional signal.

8 Claims, 16 Drawing Sheets

PRESENSE OF EDGE

ABSENSE OF EDGE

HOR DIRECTION

VER DIRECTION

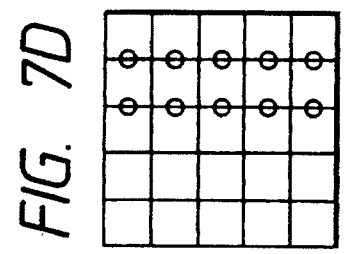
FIG. 7A UPWARD EDGE DETECTION
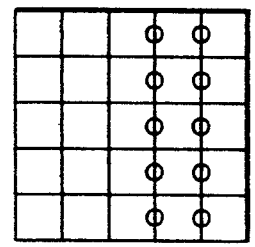
FIG. 7B DOWNWARD EDGE DETECTION
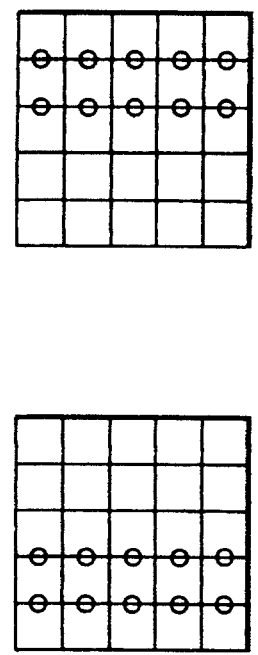
FIG. 7C LEFTWARD EDGE DETECTION
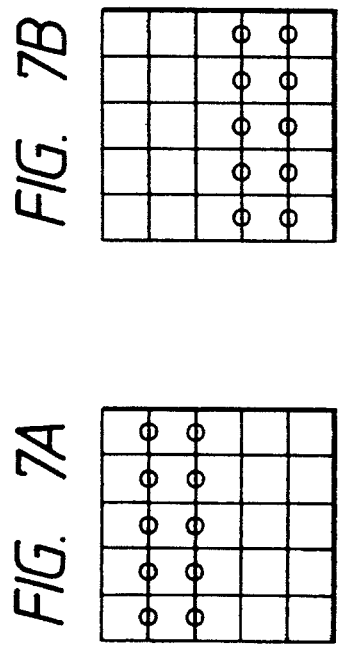
FIG. 7D RIGHTWARD EDGE DETECTION
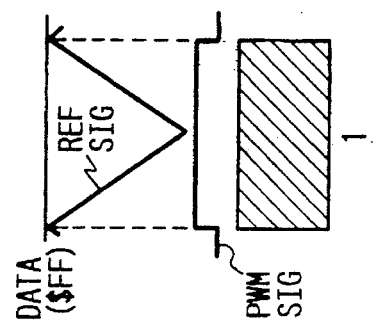
FIG. 8A DATA ($00) REF SIG PWM SIG
FIG. 8B DATA ($55) REF SIG PWM SIG 1/3
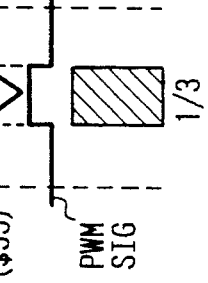
FIG. 8C DATA ($AA) REF SIG PWM SIG 2/3
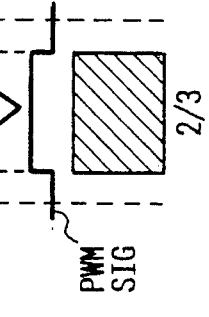
FIG. 8D DATA ($FF) REF SIG PWM SIG 1
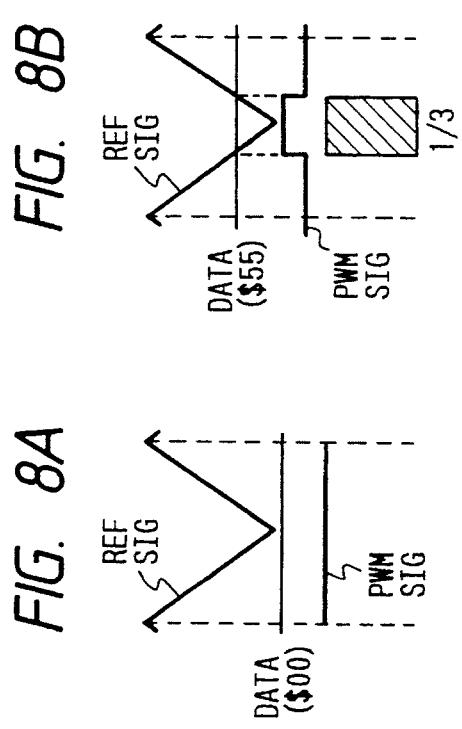

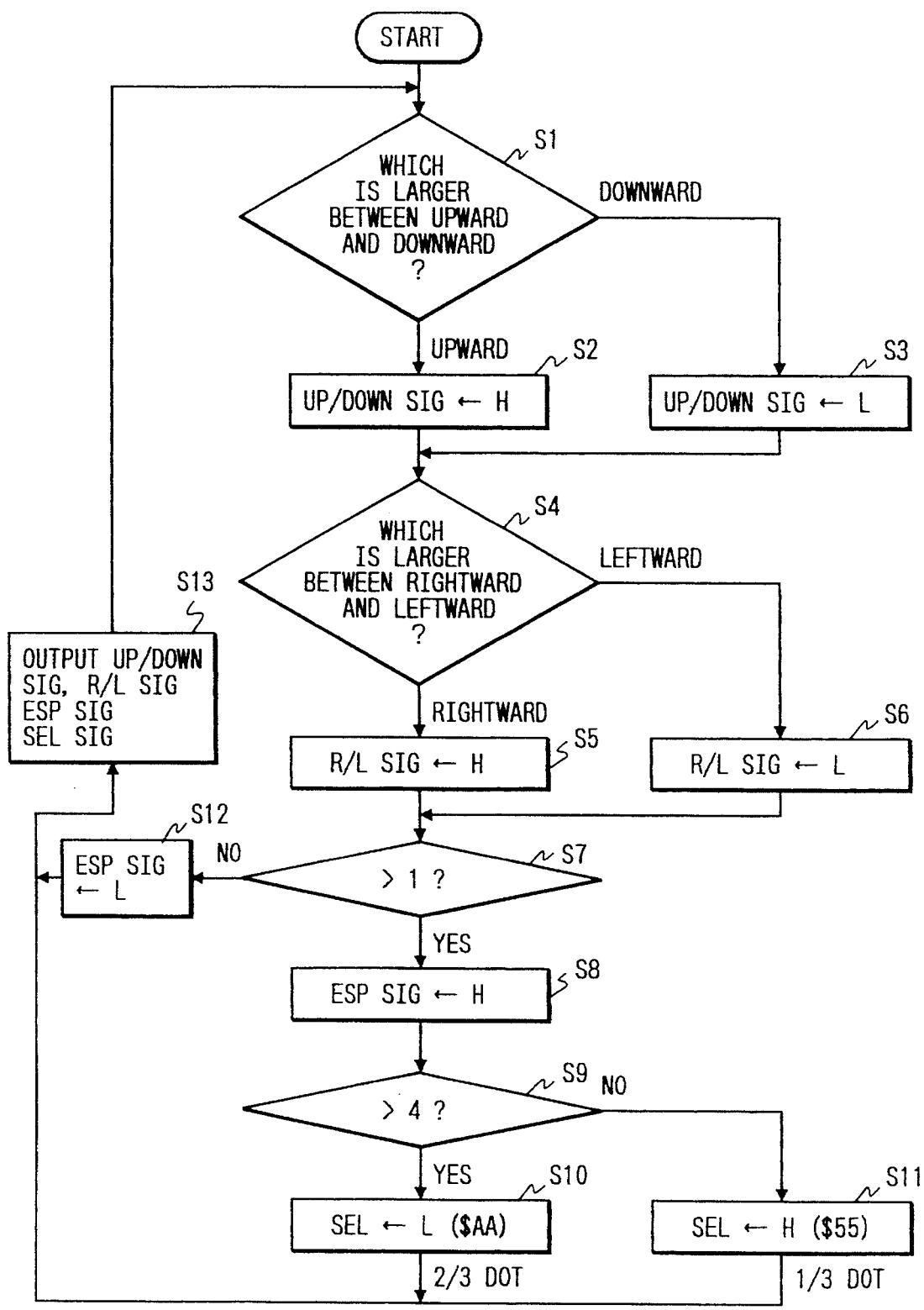

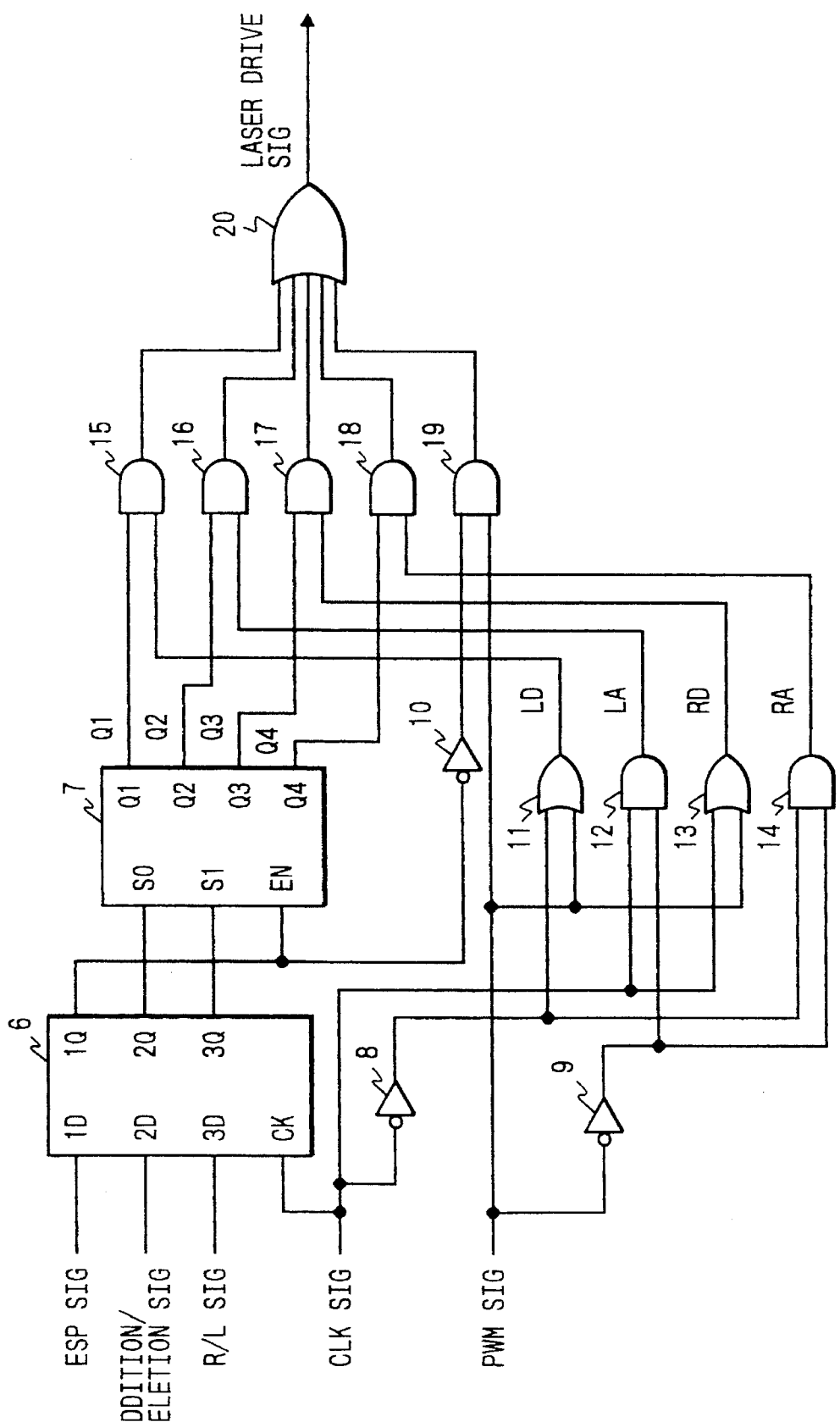

WITHOUT ESP

IMAGE FORMING APPARATUS WITH EDGE SMOOTHING

BACKGROUND OF THE INVENTION

1. Field of the Invention

This invention relates to an image forming apparatus with edge smoothing.

2. Description of the Prior Art

Image forming apparatus for forming a video image from a continuous tone video signal through a half tone processing are known. A laser beam printer as one of such image forming apparatus provides a half tone image by scanning a photosensitive material with a laser beam which is pulse-width-modulated by a video density signal. A color laser printer forms a color image by combining halftone images of primary colors and reproduces a color image on a recording paper. A black halftone image may be added to the combined image.

FIG. 15 is a block diagram of a prior art laser beam printer. A d/a converter 1 receives video density data and latches the video density data in response to a clock signal which is in phase with the video data and converts video data into an analog video density signal. A reference signal generation circuit 2 generates a reference signal having sawtooth waves for pulse width modulation in response to a clock signal. A comparing circuit 3 compares the analog video density signal with the reference signal to produce a pulse-width-modulated signal. A laser diode 4 generates a pulse-width-modulated laser beam scanned on a photosensitive member (not shown). The number of tones reproduced depends on the number of bits of the video density data. For example, if the video density data has eight bits data, tones of 256 steps can be reproduced.

FIG. 16 shows waveforms respective signals of this prior art image forming apparatus.

The reference signal generation circuit 2 generates the reference signal having sawtooth waves in response to the clock signal as shown by waveforms 101 and 102. The comparing circuit 3 compares the video density signal as shown by waveform 103 with the reference signal as shown by waveform 102 and outputs the pulse-width-modulated signal such that a logic high level is outputted when the magnitude of the video density signal is larger than that of the reference signal and a logic low level is outputted when the magnitude of the video density signal is smaller than that of the reference signal as shown by wave form 104. One pixel corresponds to one period of the clock signal as shown by waveform 101 and to an interval between two consecutive peaks of the reference signal. A valley of the reference signal corresponds a center of the pixel. The laser diode 4 produces the laser beam pulse-modulated by the video density signal and forms a halftone image on the photosensitive member through scanning. When video density data indicative of the most shadow level, the pulse-width-modulated signal shows the logic high level during 100% of the one pixel period, that is, a maximum dot is formed. When video density data is indicative of a tone of 50% of the maximum dot, the pulse-width-modulated signal shows the logic high level during 50% of the one pixel period. That is, the pulse-width-modulation signal is produced such that a dot formed in a pixel grows around the center of the pixel in accordance with the magnitude of the video density signal when the dot is seen on the printed copy.

FIG. 17 is an illustration of a video image reproduced by the prior art image forming apparatus mentioned above.

FIG. 18 shows waveforms observed at respective portions of the prior art image forming apparatus when the video image shown in FIG. 17 is formed. As shown in FIG. 17, at the second pixel (dot) on the second line, the video density data indicates 100% dot, the laser diode 4 emits the laser beam during one pixel period because the video density data is larger in magnitude than the reference signal during the pixel period. At other pixels on the second line, no dot is formed because the video density data is smaller in magnitude than the reference signal during the pixel periods of these pixels.

When video density data such that the video image is reproduced as shown in FIG. 17 is inputted to the prior art image forming apparatus shown in FIG. 15, the reproduced video image provides a user unpleasant feeling because there is an edge serration between the second and third lines.

SUMMARY OF THE INVENTION

The present invention has been developed in order to remove the above-described drawbacks inherent to the conventional image forming apparatus.

According to the present invention there is provided an image forming apparatus comprises: a dot forming unit responsive to a drive signal for forming a dot on a pixel when the drive signal is indicative of forming the dot to reproduce a half tone image; a drive signal generation circuit for generating the drive signal in accordance with a video density signal, a deletion signal, an addition signal, and a directional signal, the deletion signal indicating that the video density signal of the pixel shows a shadow level and there is a first edge adjacent to the pixel in a first image indicted by the video density signal, the addition signal indicating that the video density signal of the pixel shows a highlight level and there is a second edge adjacent to the pixel in a second image indicted by the video density signal, the directional signal indicating a direction of the first and second edges from the pixel. The drive signal is pulse-modulated by the video density signal. When the addition signal indicates an addition mode, a small dot is added at one of side portions of the pixel in accordance with the directional signal. When the deletion signal indicates a deletion mode, one of side portions of the dot which would be formed in accordance with the video density signal is deleted in accordance with the directional signal.

According to the present invention there is also provided an image forming apparatus comprising: a dot forming unit responsive to a drive signal for forming a dot on a pixel when the drive signal is indicative of forming the dot to reproduce a half tone image; a drive signal generation circuit responsive to a video density signal, a deletion signal, an addition signal, and a directional signal for generating the drive signal in accordance with the video density signal and for generating the drive signal such that one of side portions of the dot which would be formed in accordance with the video density signal is deleted when the deletion signal indicates a deletion mode, the one side portion being determined by the directional signal, and for generating the drive signal such that a small dot is formed at one of side edge portions of the pixel when the addition signal indicates an addition mode, the one of side portion being determined by the directional signal, the deletion signal indicating that the video density signal of the pixel shows a shadow level and there is a first edge adjacent the pixel in a first image indicated by the video density signal, the addition signal indicating that the video density signal of the pixel shows a highlight level and there is a second edge adjacent to the pixel in a second image indicated by the video density signal, the directional signal indicating a direction of the first and second edges from the pixel.

According to the present invention there is further provided an image forming apparatus for forming an image comprising: a dot forming unit responsive to a drive signal for forming a dot on a pixel when the drive signal indicates forming the dot; a first drive signal generation circuit for generating a first drive signal pulse-modulated with a video density signal; an edge detector for generating a deletion signal, an addition signal, and a directional signal, the deletion signal indicating that the video density signal of the pixel shows a shadow level and there is a first edge adjacent to the pixel in a first image indicated by the video density signal, the addition signal indicating that the video density signal of the pixel shows a highlight level and there is a second edge adjacent to the pixel in a second image indicated by the video density signal, the directional signal indicating a direction of the first and second edges from the pixel; and a second drive signal generation circuit for generating a second drive signal to form a second dot smaller than the pixel in response to the deletion signal of which position is determined in accordance with the directional signal and for generating a third drive signal to form a third dot smaller than the second dot in response to the addition signal of which position is determined in accordance with the directional signal; and a selection circuit for selecting and supplying the first drive signal to the dot forming means as the drive signal in the absence of the addition and deletion signals, for selecting and supplying the second drive signal to the dot forming unit as the drive signal in the presence of the deletion signal, and for selecting and supplying the second drive signal to the dot forming unit as the drive signal in the presence of the addition signal.

According to the present invention there is still further provided an image forming apparatus for forming an image comprising: a dot forming unit responsive to a drive signal for forming a dot on a pixel when the drive signal indicates forming the dot; an edge detection circuit for generating a deletion signal, an addition signal, and a directional signal, the deletion signal indicating that the video density signal of the pixel shows a shadow level and there is a first edge adjacent to the pixel in a first image indicated by the video density signal, the addition signal indicating that the video density signal of the pixel shows a highlight level and there is a second edge adjacent to the pixel in a second image indicated by the video density signal, the directional signal indicating directions of the first and second edges from the pixel; and a drive signal generation circuit for generating the drive signal to change a size of the dot in accordance with a video density signal, for further reducing the size of the dot in accordance with the deletion signal in the presence of the deletion signal, and for further increasing the size of the dot in accordance with the addition signal in the presence of the addition signal, and for determining a position of the size-changed dot within the pixel in accordance with the directional signal.

The dot forming unit may comprise a laser diode for emitting a laser beam in response to the drive signal and a scanning unit for scanning the laser beam or a thermal head.

The drive signal generation circuit may generate the drive signal with a pulse width of the drive signal varied with the video density signal.

BRIEF DESCRIPTION OF THE DRAWINGS

The object and features of the present invention will become more readily apparent from the following detailed description taken in conjunction with the accompanying drawings in which:

FIGS. 7A to 7D are illustration of first and second embodiments for showing edges which are objective for the operation circuit;

FIGS. 8A to 8D show waveforms of the video signal and the reference signal of first and second embodiments;

FIG. 11 shows a flow chart of first and second embodiments of the judging circuit;

FIG. 12 is a block diagram of first and second embodiments for showing the structure of the gate circuit shown in FIG. 1;

The same or corresponding elements or parts are designated as like references throughout the drawings.

DETAILED DESCRIPTION OF THE INVENTION

Hereinbelow will be described an embodiment of this invention.

Figure 1:
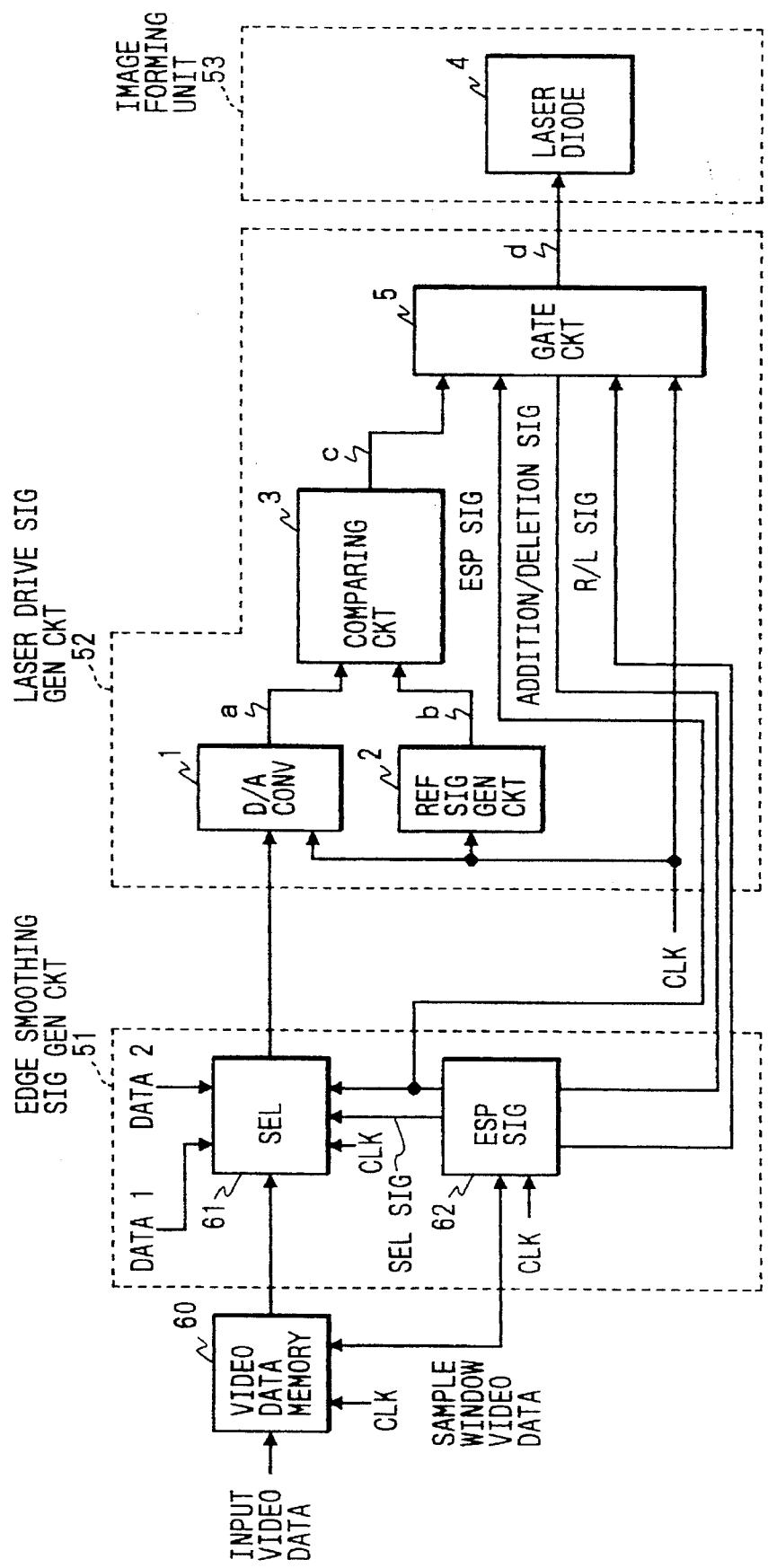
FIG. 1 is a block diagram of first and embodiments of image forming apparatus of this invention.

FIG. 1 is a block diagram of the first embodiment of image forming apparatus of this invention. FIG. 1 is also used in the second embodiment. In this embodiment, one channel of video signal is processed. However, if reproduction of color image is desired, three primary color images reproduced separately and combined into one color image as well known. Each of primary color video density signals represented by eight bit data for example. A black color image may be added. The image forming apparatus of this embodiment comprises an edge smoothing signal generation circuit 51 responsive to a video signal (video density signal) and a clock signal for generating a selected video signal, an edge smoothing processing signal (ESP signal), an addition/deletion signal, and a directional (R/L) signal, a laser drive signal generation circuit 52 for generating a laser drive signal in response to the selected video signal, the clock signal, the ESP signal, the addition/deletion signal, and the directional signal, and an image forming unit 53 having a laser diode 4 for emitting a laser beam toward a photosensitive drum (not shown) in response to the laser drive signal. The ESP signal indicates an edge smoothing condition (H) and non-edge smoothing condition (L). The addition/deletion signal indicates an adding condition (H) in which a small dot should be added and a deleting condition (L) in which a dot formed in accordance with the video Signal should be partially deleted. The directional signal (R/L) indicates to which side of a pixel a sinall dot should be added or which side part of a dot should be deleted wherein the right side is indicated by a logic H level (H) and the left side is indicated by a logic L level (L). The addition/deletion signal and the directional signal are valid in the condition that the ESP signal is H. The addition/deletion signal and the directional signal, and the ESP signal are produced in phase with the video data because the video data is read from the video data memory 60 in response to the clock signal which is also used in the image forming apparatus of this embodiment.

The edge smoothing signal generation circuit 51 generates the selected video signal, the ESP signal, the addition/deletion signal, and the directional signal in accordance with input video data in response to the clock signal. The processing is, for example, as follows:

The edge smoothing signal generation circuit 51 effects predetermined operations with respect to an object (center) pixel and surrounding pixels of the object pixel, namely 3 (main scanning direction)×3 (sub-scanning direction) or 5×5 pixels to determine whether or not the edge smoothing processing should be done, whether a dot should be added or deleted, and to which side of pixel should be added or which part of a dot should be deleted.

The edge smoothing signal generation circuit 51 generates the ESP signal, the addition/deletion signal, and the directional (R/L) signal on the basis of the result of the operations and supplies these signals to the laser drive signal generation circuit 52.

The laser drive signal generation circuit 52 comprises a d/a converter 1 for converting the video signal sent from the edge smoothing signal generation circuit 51 into an analog video signal a, a reference signal generation circuit 2 for generating a reference signal b having a sawtooth wave, a comparing circuit 3 for comparing the analog video signal with the reference signal to generate a pulse-width-modulated signal c, and a gate circuit 5 responsive to the pulse-width-modulated signal, the ESP signal, the addition/deletion signal, the R/L signal for generating a laser drive signal d in accordance with a predetermined logic operation mentioned later.

The laser diode 4 produces the laser beam pulse-modulated by the video signal and forms a halftone image on the photosensitive drum through scanning in response to the laser drive signal. When video data indicative of the most shadow level, the pulse-width-modulated signal shows the logic high level during 100% of the one pixel period, that is, a maximum dot is formed. When video data indicative of a tone of 50% of tile maximum dot, the pulse-width-modulated signal shows the logic high level during 50% of the one pixel period. That is, the pulse-width-modulation signal is produced such that a dot formed in a pixel grows around the center (center line) of the pixel in accordance with the magnitude of the video signal when the dot is seen on the printed copy.

Figure 2:
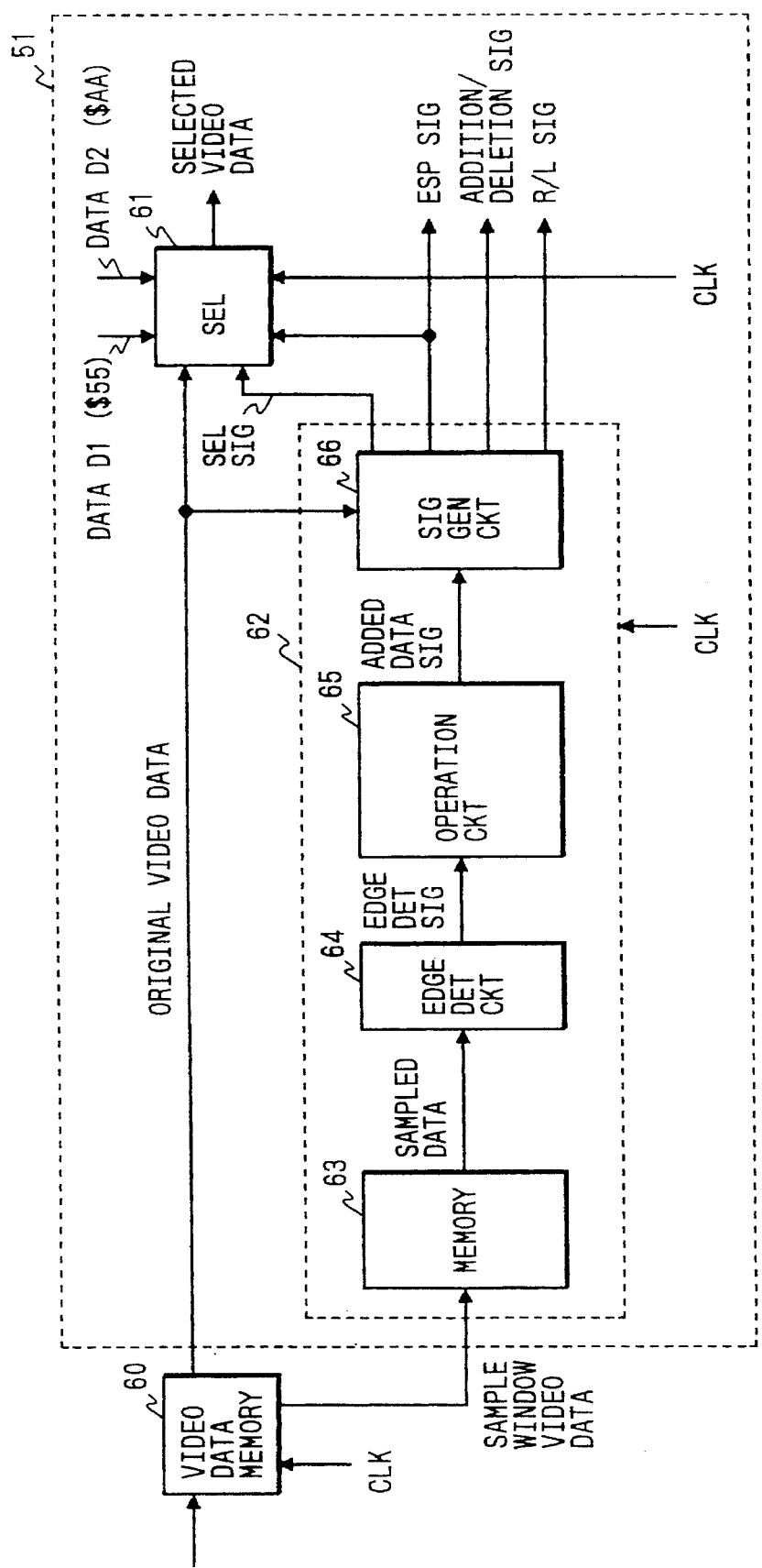
FIG. 2 is a block diagram of the first embodiment for showing the edge smoothing signal generation circuit.

FIG. 2 is a block diaggam of the first embodiment embodiment for showing the edge smoothing signal generation circuit 51. The edge smoothing signal generation circuit 51 comprises a memory 63 for storing a sample window video data of a predetermined block area of pixels in responsive to the clock signal to form a sample window and for supplying stored video data as sampled data to an edge detection circuit 64, the edge detection circuit 64 for detecting edges in accordance with the sampled data to supply four directional edge detection signals to an operation circuit 65, the operation circuit 65 for adding times of detected edges regarding the four directions to supply added four directional data signals to a signal generation circuit 66 for generating the selection signal and the ESP signal, the addition/deletion signal, and the R/L signal in accordance with the added four directional data signals and the original video data, and a selector 61 for selecting either of the original video data, data D1 ($55), or data D2 ($AA) in response to the selection signal. liere, "$" means a hexadecimal notation.

Figure 3:
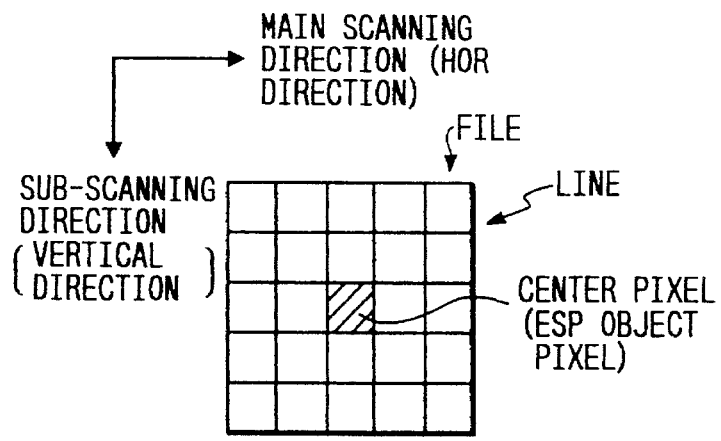
FIG. 3 is an illustration of first and second embodiments for showing a sample window.

FIG. 3 is an illustration of this embodiment for showing a sample window formed by the memory 63. The video data memory 60 supplies video data of five horizontal lines. For example, assuming the memory 63 has a 5×5 pixel window as shown in FIG. 3, the video data corresponding to the center pixel (edge smoothing processing object pixel) agrees with the video data of the original video data outputted from the video data memory 60. When the memory 63 stores a file (vertical line) of video data, video data stored in the memory 63 in advance by five pixel period is dumped from the memory 63.

Figure 4:
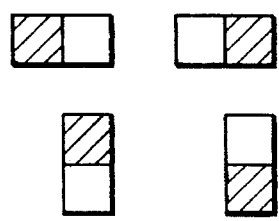
FIG. 4 is an illustration of first and second embodiments for showing cases of the presence of edges detected by the edge detection circuit.

FIG. 4 is an illustration of this embodiment for showing cases of the presence of edges detected by the edge detection circuit 64.

Figure 5:
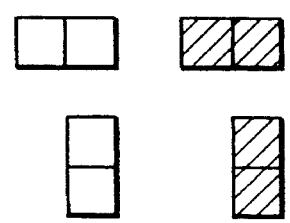
FIG. 5 is an illustration of first and second embodiments for showing cases of the absence of edges detected by the edge detection circuit.

FIG. 5 is an illustration of this embodiment for showing cases of the absence of edges detected by the edge detection circuit 64.

The edge detection circuit 64 detects edges by comparing video data of two neighbor pixels in the sample window. That is, as shown in FIG. 4, if there is a large difference in magnitude between data of one pixel and data of the neighbor pixel in the sample window, an edge is present. That is, if there is a difference in density which is larger than a predetermined value, there is an edge. Similarly, as shown in FIG. 5, if there is not a large difference in magnitude between data of one pixel and data of the neighbor pixel in the sample window, an edge is absent.

Figure 6A:
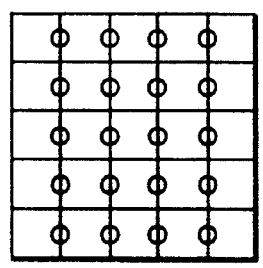
FIG. 6A is an illustration of first and second embodiments for showing the edge detection in the horizontal direction.

FIG. 6A is an illustration of this embodiment for showing the edge detection in the horizontal direction. As shown in FIG. 6A, the edge detection circuit 64 detects edges in the horizontal direction by comparing video data between neighbor pixels marked by circles.

Figure 6B:
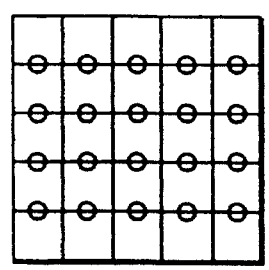
FIG. 6B is an illustration of first and second embodiments for showing the edge detection in the vertical direction.

FIG. 6B is an illustration of this embodiment for showing the edge detection in the vertical direction. As shown in FIG. 6B, the edge detection circuit 64 detects edges in the vertical direction by comparing video data between neighbor pixels marked by circles. Actually, the comparing is made among a file (vertical line) of the video data recently stored and among the recently stored file of the video data and the previously stored neighbor file of the video data and the results are stored with a correspondence with the sample window.

The operation circuit 65 detects upward edges, downward edges, leftward edge, and rightward edges with respect to the center pixel and added the number of the detections of respective direction edges.

FIGS. 7A to 7D are illustration of this embodiment for showing edges which are objective for the operation circuit 65. The operation circuit 65 detects the number of times of detections of upward edges within a fist area as shown in FIG. 7A, the number of times of detections of downward edges within a second area as shown in FIG. 7B, the number of times of detections of leftward edges with in a third area as shown in FIG. 7C, and the number of times of detections of rightward edges within a fourth area as shown in FIG. 7D.

For example, assuming the number of times of leftward edges is six, the added leftward edge data is six. The operation circuit 65 supplies added upward edge data, added downward edge data, and added leftward edge data, added rightward edge data to the signal generation circuit 66.

The signal generation circuit 66 judges whether or not the center pixel includes an edge in accordance with the added data of respective directions to determine the edge smoothing processing. The larger the added data the larger degree of existence of an edge in the direction of the added data.

In this embodiment, there are two degrees of addition of a small dot or deletion of a dot, that is, one third of a full (100%) dot and two thirds of a full dot. The video data has eight bits data for each primary color, so that, video data of 0% corresponds to a hexadecimal value $00, video data of a one third dot corresponds to a value of $55, for example, a two third dot corresponds to a value of $AA, and the full dot corresponds to a value of $FF as shown in FIGS. 8A to 8D. FIGS. 8A to 8D show waveforms of the video signal and the reference signal of this embodiment. Therefore, when one third dot is added or one third part of a dot is deleted, data D1 ($55) is outputted from the selector 61 in place of the original video data. When a two third dot is added or two third parts of a dot is deleted, data D2 ($AA) is outputted from the selector 61 in place of the original video data.

Figure 9:
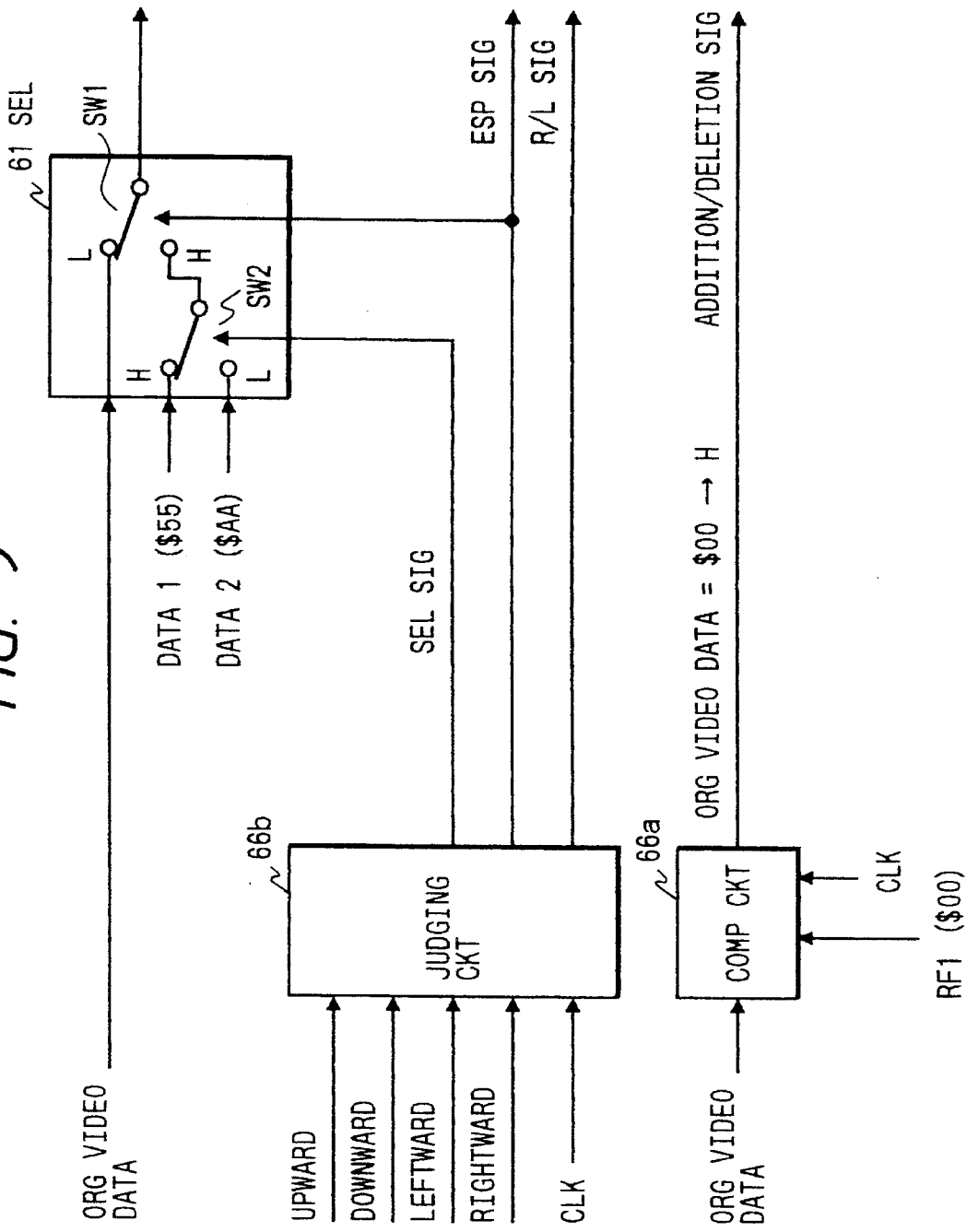
FIG. 9 is a block diagram of the first embodiment for showing structure of the signal generation circuit.

FIG. 9 is a block diagram of this embodiment for showing structure of the signal generation circuit 66. The signal generation circuit 66 comprises a comparing circuit 66a for comparing the original video data with a reference value RF1 ($00) to determine whether the center pixel is highlight or not highlight to producing the addition/deletion signal, and a Judging circuit 66b responsive to the added upward edge data, the added downward edge data, the added leftward edge data, and the added rightward data for judging whether or not the edge smoothing should be effected, whether a small dot is added to the left side or the right side of the center pixel or which part of the dot of the center pixel is deleted, and which size of a dot should be added or deleted between ⅓ dot and ⅔ dot.

The comparing circuit 66a compares the original video data with the reference value RF1 ($00) to determine whether addition or deletion should be effected. If the original video data (center pixel) indicate a highlight and an edge is detected, a small dot is added to smooth an edge by making the addition/deletion signal H level. If the original video data does not a highlight, the dot of the center pixel is partially deleted to smooth an edge by making the addition/ deletion signal L level. The addition/deletion signal is outputted in response to the clock signal.

Degrees of addition and deletion of a dot depend on the values of the added upward edge data, the added downward edge data, the added rightward edge data, and the added leftward edge data. The larger the added edged data, the larger the degree of edge. In this embodiment, if the degree of an edge is large a large dot, that is, a two-third dot is added or two thirds parts of a dot is deleted. More specifically, if the added edge data is larger than five, a two-third dot is added or two third parts of the dot are deleted. If the added edge data is not larger than five, a one third dot is added or one third part of the dot is deleted. The timing of addition of a dot or deletion of a dot is provided with predetermined values compared with the reference signal and the clock signal. That is, the comparing circuit 3 is used as a timer means by comparing the predetermined value with the reference signal.

Figure 10:
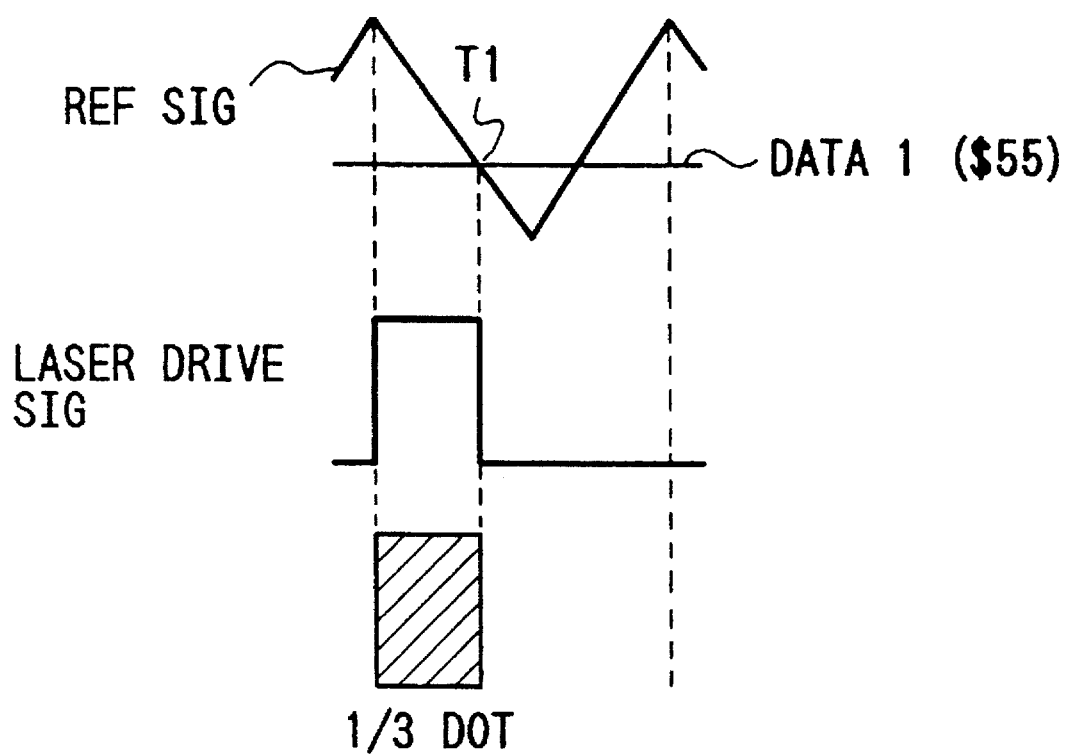
FIG. 10 shows waveforms of first and second embodiments for showing signals regarding the comparing circuit shown in FIG. 1.

More specifically, the selection circuit 61 selects the data D1 ($55) in response to the selection signal from the signal generation circuit 66 to supply the data D1 to the comparing circuit 3. The comparing circuit 3 obtains a timing of forming a one third dot or deletion of one third part of a dot. FIG. 10 shows waveforms of this embodiment for showing signals regarding the comparing circuit 3 and the laser drive signal. When the signal generation circuit 66 supplies the selection signal to the selection circuit 61 to select the data D1 in the ESP condition. Then, the comparing circuit 3 compares the data D1 with the reference signal. Thus, a timing T1 for forming one third dot or deletion of one third part of a dot is obtained. However, the final laser drive signal shown in FIG. 10 is generated in the gate circuit 5 using the PWM signal including information of the timing T1, the clock signal, the ESP signal, the addition/deletion signal, and the R/L signal.

FIG. 11 shows a flow chart of this embodiment of the judging circuit 66b.

The judging circuit 66b judges the added upward edge data, the added downward edge data, the added rightward edge data, the added leftward edge data to produce the selection signal, the ESP signal, the R/L signal in accordance with the flow chart as shown in FIG. 11.

Processing starts at step S1 when the image forming apparatus is set to the ESP mode. In the non-ESP mode, the ESP signal remains L. In step S1, a decision is made as to which is larger between the added upward edge data and the added downward edge data. If the added upward edge data is larger than the added downward edge data, an up/down signal is set to be H in step S2. If the added upward edge data is not larger than the added downward edge data, the up/down signal is set to be L in step S3. After processing of steps S2 and S3, in step S4, a decision is made as to which is larger between the added rightward edge data and the added leftward edge data. If the added rightward edge data is larger than the added leftward edge data, the R/L signal is set to be H in step S5. If the added rightward edge data is not larger than the added leftward edge data, the R/L signal is set to be L in step S6. After processing of steps S5 or S6, a decision is made as to whether or not the larger added edge data is larger than one in step S7. If the larger added edge data is larger than one, the ESP signal is set to be H in step S8. If the larger added edge data is not larger than one, the ESP signal is set to be L in step S12. After processing in step S8, a decision is made as to whether or not the larger added edge data is larger than five in step S9. If the larger added edge data is larger than five, the selection signal is set to be L to select data D2 ($AA) in step S10. If the larger added edge data is not larger than five, the selection signal is set to be H to select the data D1 ($55) in step S12.

After processing in step S10, S11, or S12, the judging circuit 66b outputs the up/down signal, the R/L signal, the ESP signal, and the selection signal in phase with the clock signal in step S13. Then, processing returns to step S1.

Operation of the signal generation circuit 66 will be described with an example.

It is assumed that the original video data, namely, the video data of the center pixel is highlight, the added upward edge data is 1, the added downward edge data is 0, the added leftward edge data is 3, and the added rightward edge data is 0.

In this embodiment, upward and downward edge processings are omitted. However, basically, if a dot is formed in the sub-scanning direction (vertical direction) through three main scanning lines, the similar edge smoothing can be obtained. That is, the addition of a one third dot or a two thirds of dot or deletion of one third part or two third parts of dot are obtained similarly.

In step S2, the up/down signal is set to be H because the added upward edge data is 1. In step S6, the R/L signal is set to be L because the added leftward edge data is 3. In step S8, the ESP signal is set to be H because the added leftward edge data is 3. In step S11, the selection signal is set to cause the selection circuit 61 to select the data D1 ($55) to obtain the timing T1 to add a one-third dot because the added leftward edge data is not larger than four and the original video data, namely, the video data of the center pixel is highlight. In the step S13, the ESP signal, the selection signal indicative of the data D1, and the R/L signal (L) are outputted.

The selection circuit 61 is supplies the original video data to the laser drive signal generation circuit 52 through a switch SW1 in response to the ESP signal when the ESP signal is not in the ESP condition, namely L. On the other hand, when the ESP signal is in the ESP condition, namely, H, and the selection signal is H, the selection circuit 61 supplies the data D1 to the laser drive signal generation circuit 52. When the ESP signal is in the ESP condition, namely, H, and the selection signal is L, the selection circuit 61 supplies the data D2 through a switches SW2 and SW1 to the laser drive signal generation circuit 52.

The above mentioned processing is carried out by a microprocessor. However, this is only example and if such an operation is carried out by a discrete electronic circuit, the processing speed will be increased.

Moreover, the ESP signal generation 62 is only example. If the ESP signal, the addition/deletion signal, the R/L signal are provided from other edge detection circuit, the image formation with edge smoothing can be provided by the image forming apparatus of this invention also. That is, the edge detection method for smoothing the edge serration is shown in U.S. Pat. No. 4,847,641, the disclosure of which is hereby incorporated by reference. Moreover, the edge detection method is shown in U.S. patent application Ser. No. 07/864,769, the disclosure of which is hereby incorporated by reference.

More specifically, these disclosures teach methods of detection of edge (ESP signal), determination of addition or deletion of a dot (addition/deletion signal), and direction of the detected edge (R/L signal). Therefore, the ESP signal, the addition/deletion signal, and the R/L signal can be generated by these methods and are applied to the selection circuit 61 and the laser drive signal generation circuit 52. The selection signal can be replaced with the ESP signal when the number of steps of deletion or addition of a dot is one.

FIG. 12 is a block diagram of the first and second embodiments showing the structure of the gate circuit 5. The gate circuit 5 comprises a latch circuit 6 for latching the ESP signal, the addition/deletion signal, and the R/L signal in response to the clock signal, a decoding circuit 7 for decoding the latched edge smoothing signal, addition/deletion signal, and R/L signal, AND gates 15 to 18 for controlling of outputting of signals derived from the pulse-width-modulated signal in accordance with the outputs of the decoding circuit 7, an AND gate 19 for controlling of outputting the pulse-width-modulated signal in accordance with the latched ESP signal via an inverter 10, a multi-input OR gate 20 effects OR operation among the outputs of the AND gates 15 to 19 and supplies the result, namely, the laser drive signal to the laser diode 4, an inverter 8 for inverting the clock signal to obtain an inverted clock signal, an inverter 9 for inverting the pulse-width-modulated signal to obtain an inverted pulse-width-modulated signal, an OR gate 11 for effecting the OR operation between the pulse-width-modulated signal and the inverted clock signal to produce an output signal LD supplied to one input of the AND gate 15, an AND gate 12 for effecting the AND operation between the inverted pulse-width-modulated signal and the clock signal to produce an output signal LA supplied to one input of the AND gate 16, an OR gate 13 for effecting OR operation between the pulse-width-modulated signal and the clock signal to produce an output signal RD supplied to one input of the AND gate 17, and an AND gate 14 for effecting the AND operation between the inverted pulse-width-modulated signal and the inverted clock signal to produce an output signal RA supplied to one input of the AND gate 18.

The decoder 7 outputs outputs Q1 to Q4 in accordance with a predetermined decoding operation which is shown in the following table 1.

TABLE 1

| INPUTS OF DECODER | | | OUTPUTS OF DECODER | | | |
|---|---|---|---|---|---|---|
| EN | S0 | S1 | Q1 | Q2 | Q3 | Q4 |
| L | X | X | L | L | L | L |
| H | L | L | H | L | L | L |
| H | H | L | L | H | L | L |
| H | L | H | L | L | H | L |
| H | H | H | L | L | L | H |

Figure 13A:
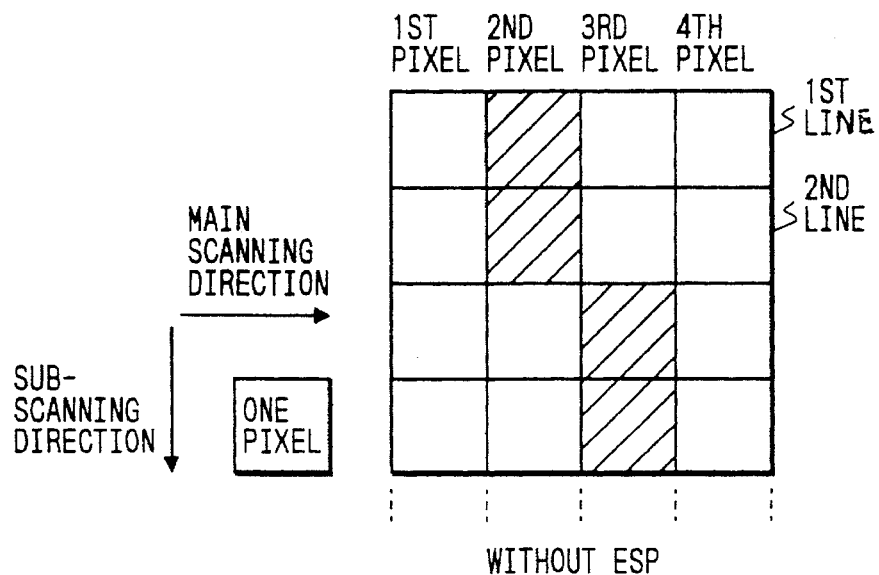
FIG. 13A is an illustration of first and second embodiments for showing a reproduced image without the ESP processing.
Figure 14A:
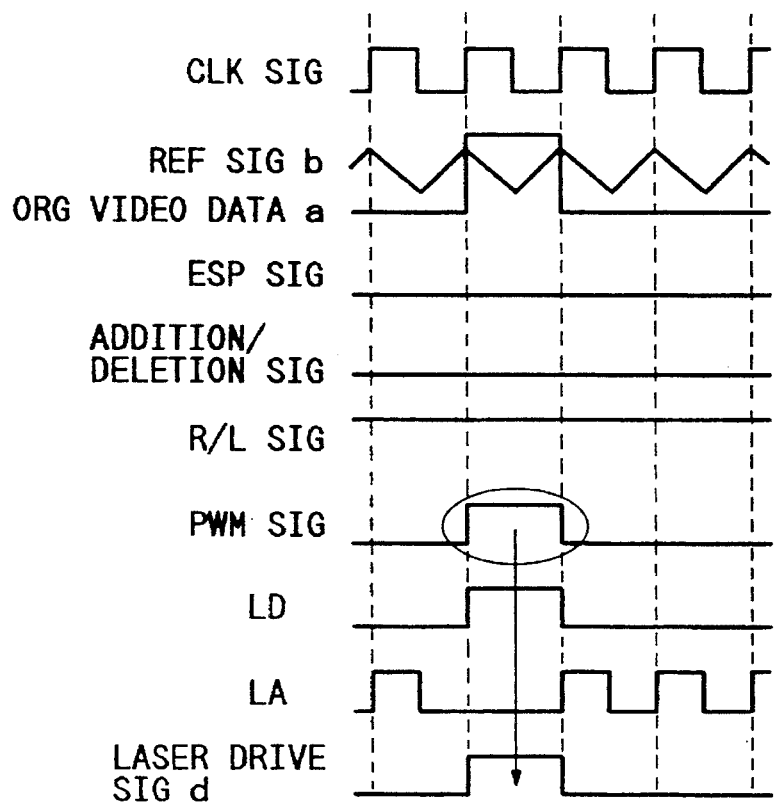
FIG. 14A shows waveforms of first and second embodiments for showing respective signals in the gate circuit in the non-ESP mode.

FIG. 13A is an illustration of this embodiment for showing a reproduced image without the ESP processing, namely, in the non-ESP mode. FIG. 14A shows waveforms of this embodiment for showing respective signals in the gate circuit 5 in the non-ESP mode.

In the non-ESP mode, the ESP signal remains L. In this condition, the outputs Q1 to Q4 of the decoder 7 remains L, so that outputs of of the AND gates 15 to 18 remains L. Therefore, only AND gate 19 is active because the inverted ESP signal (H) is inputted to one input thereof. The other input of the AND gate 19 is supplied with the PWM signal, so that the PWM signal is outputted from the OR gate 20 as the laser drive signal as it is. More specifically, at the second pixel on the second line, the original video data is larger than the reference signal during the pixel period, so that the PWM signal shows 100% duty during the second pixel period as shown in FIG. 14A.

Figure 13B:
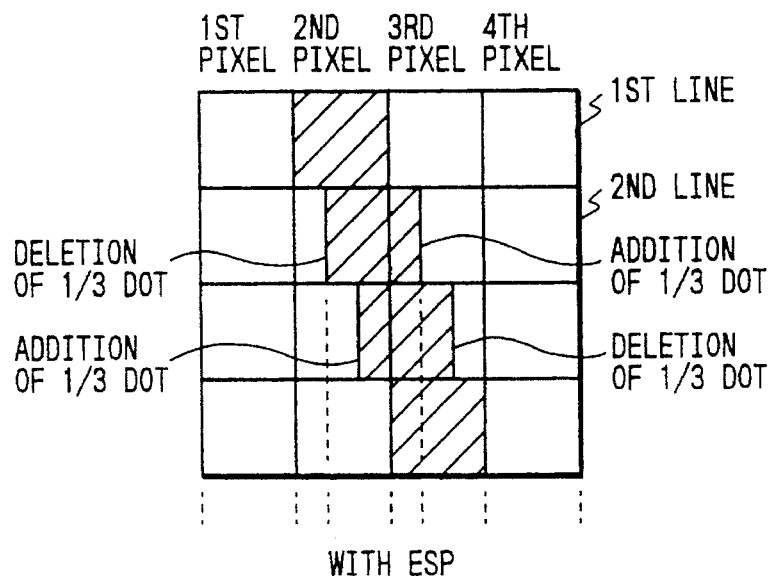
FIG. 13B is an illustration of first and second embodiments for showing a reproduced image with the ESP processing.
Figure 14B:
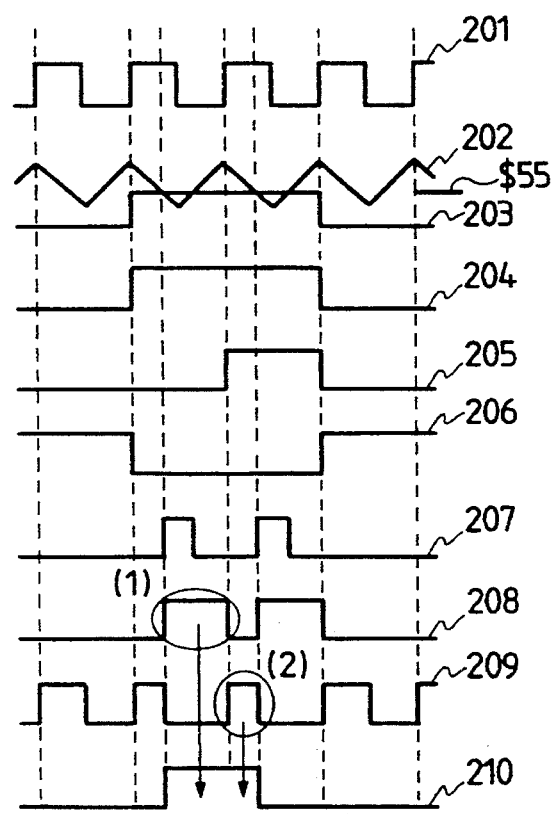
FIG. 14B shows waveforms of first and second embodiments for showing respective signals in the gate circuit in the ESP mode.
Figure 15:
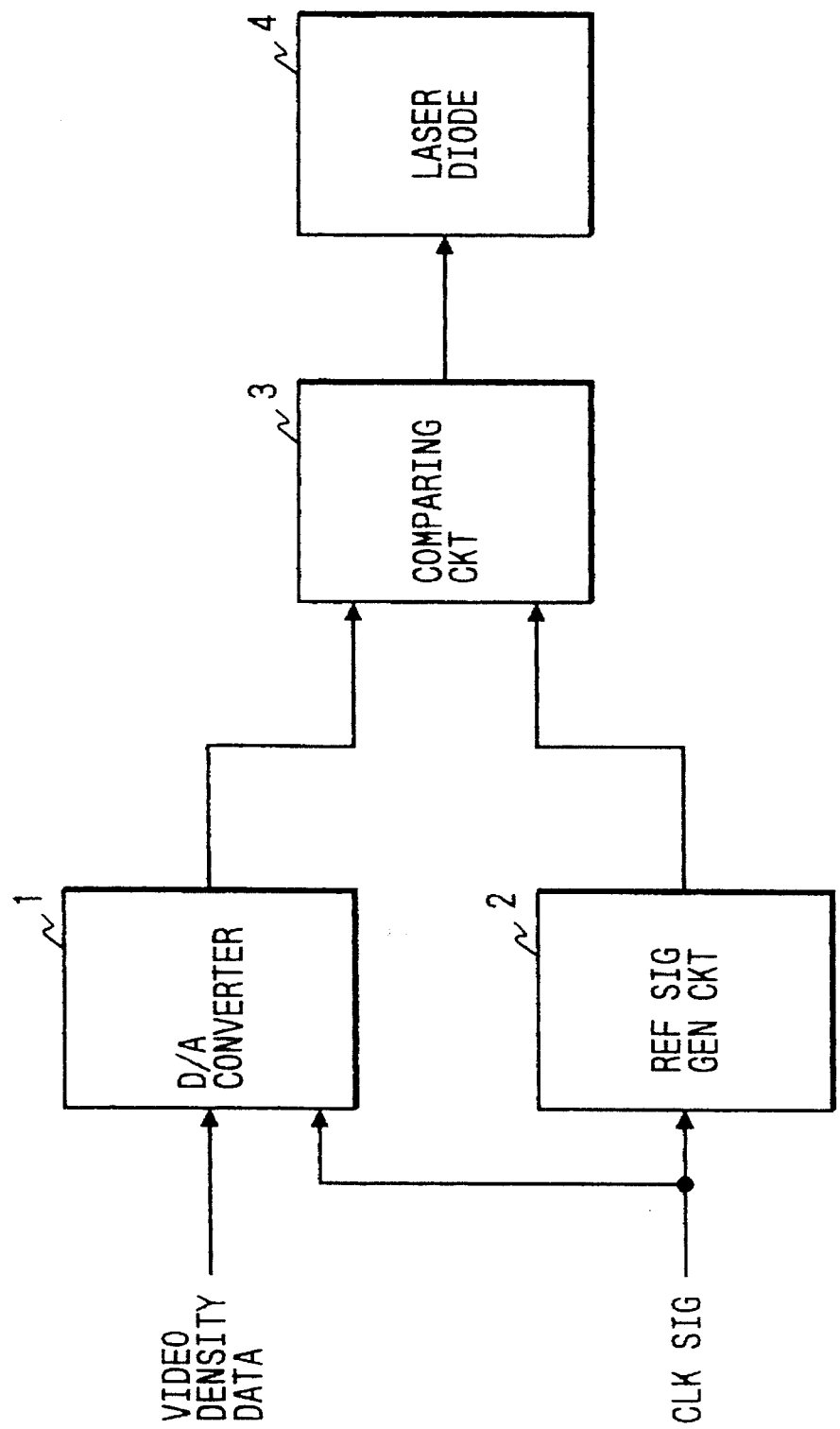
FIG. 15 is a block diagram of a prior art laser beam printer.
Figure 16:
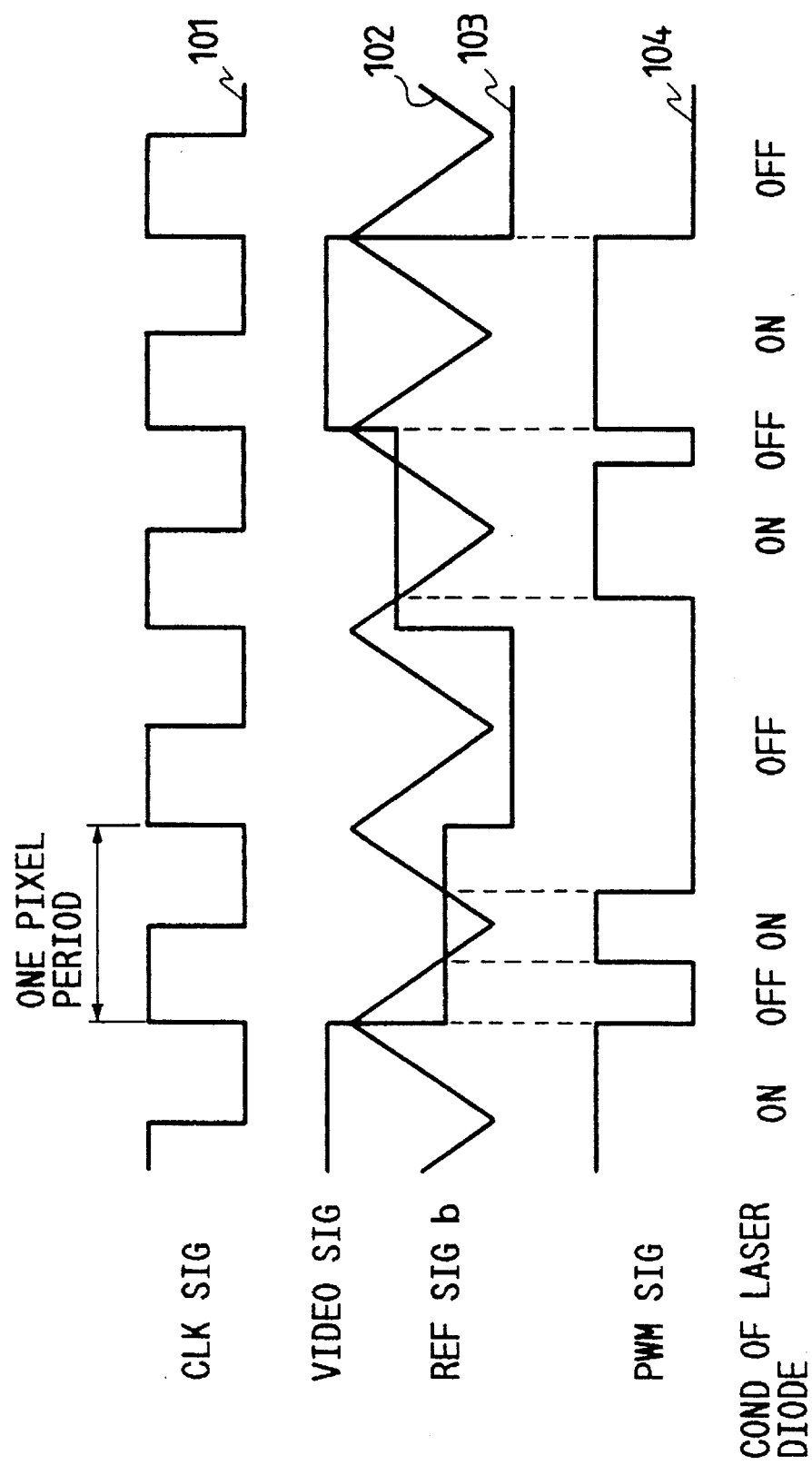
FIG. 16 shows waveforms respective signals of this prior art image forming apparatus.
Figure 17:
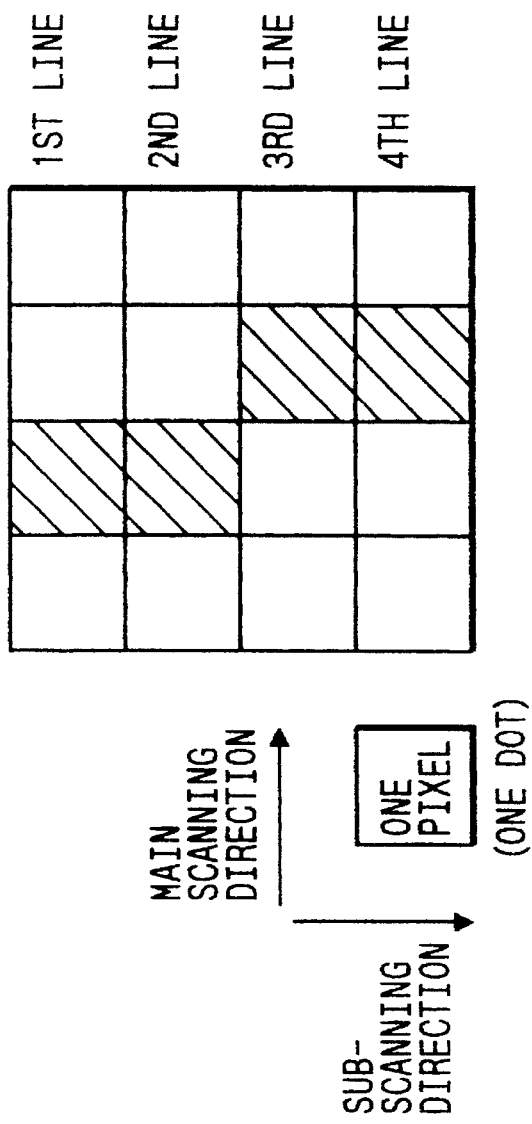
FIG. 17 is an illustration of a video image reproduced by the prior art image forming apparatus.
Figure 18:
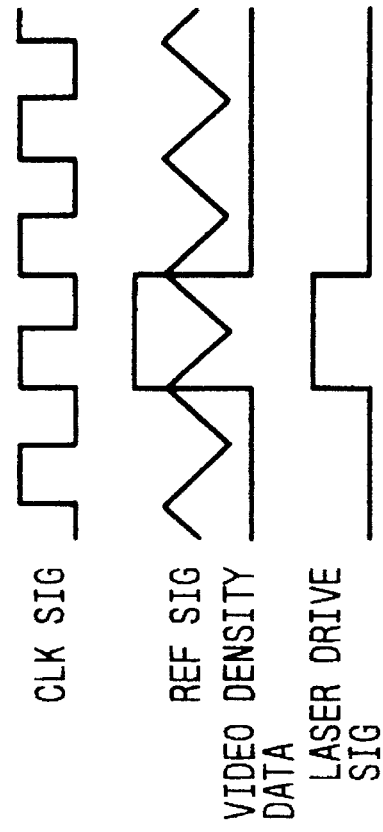
FIG. 18 shows waveforms observed at respective portions of the prior art image forming apparatus when the video image shown in FIG. 17 is formed.

FIG. 13B is an illustration of this embodiment for showing a reproduced image with the ESP processing, namely, in the ESP mode. FIG. 14B shows waveforms of this embodiment for showing respective signals in the gate circuit 5 in the condition as shown on the second line of the example video image in the ESP mode.

At first and fourth pixels on the second line, the ESP signal is L, so that the PWM signal is outputted from the gate circuit 5 as the laser drive signal as it is. That is, the original video data is lower than the reference signal at the first and fourth pixel periods, so that no dot is formed.

At the second and third pixels on the second line, the ESP signal is H, so that the AND gate 19 is disabled. Therefore, the PWM signal is not supplied to the OR gate 20.

A dot at the second pixel on the second line, a one third left side part of the dot is deleted by the edge smoothing processing. That is, the addition/deletion signal and the R/L signal are L, so that as shown in the TABLE 1, only output Q1 of the decoder 7 is H, which is connected to one input of the AND gate 15. Therefore, only AND gate 15 is enabled. The other input of the AND gate 15 is connected to the output LD of the OR gate 11. One input of the OR gate 11 is supplied with the inverted clock signal and the other input of the OR gate 11 is supplied with the PWM signal. Here, the PWM signal in this condition is produced as follows:

In the step S9 in FIG. 11, the added leftward edge data is judged as to be not larger than four, so that the selection signal is set to cause the selection circuit 61 select the data D1 ($55) during the second (third) pixel period as shown by a waveform 203.

At the third pixel on the second line, the PWM signal is produced in accordance with the data D1($55) as shown by waveform 207 because the added leftward edge data is judged as to be not larger than four also, so that the selection signal is set to cause the selection circuit 61 select the data D1 ($55) during the third pixel period as shown by a waveform 203. However, the addition/deletion signal is set to be H because the original video data is highlight as shown in FIG. 13A and the comparing circuit 66a compares the original video data with the reference value RF1 ($00). That is, a small dot should be added.

At the third pixel on the second line, the R/L signal remains L during the third pixel period. Therefore, only an output Q2 of the decoder 7 is H, so that the AND gate 16 of which one input is supplied with the output Q2 is enabled. The other input of the AND gate 16 is an output LA of the AND gate 12. The AND gate 12 is supplied with the clock signal and the inverted PWM signal. Therefore, the output signal LA is obtained as shown by the waveform 209. Therefore, during the second and third pixel periods, the laser drive signal is obtained as shown by a waveform 210. That is, the left side of a dot at the second pixel on the second line is partially deleted and a small dot is added at the left portion of the third pixel.

At the second pixel on the third line, a one third dot is added to the right part of the pixel. At this instance, the AND gate 18 is enabled, so that the laser drive signal is produced in response to an output RA of the AND gate 14. At the third pixel on the third line, one third part of the dot at right portion of the pixel is deleted. At this instance, the AND gate 17 is enabled, so that the laser drive signal is produced in response to an output RD of the AND gate 13. That is, "LD" means that a left side portion of a dot is deleted, "LA" means that a small dot is added at a left side of the pixel, "RD" means that a left side portion of a dot is deleted, and "RA" means that a small dot is added at a left side of the pixel.

As mentioned above, according to this invention, an video image having edges which tend to provide edge setration effect to the user is reproduced with edge setration smoothed.

Moreover, the changing of the data D1 or data D2 can vary a degree of addition or deletion of a dot.

Figure 19:
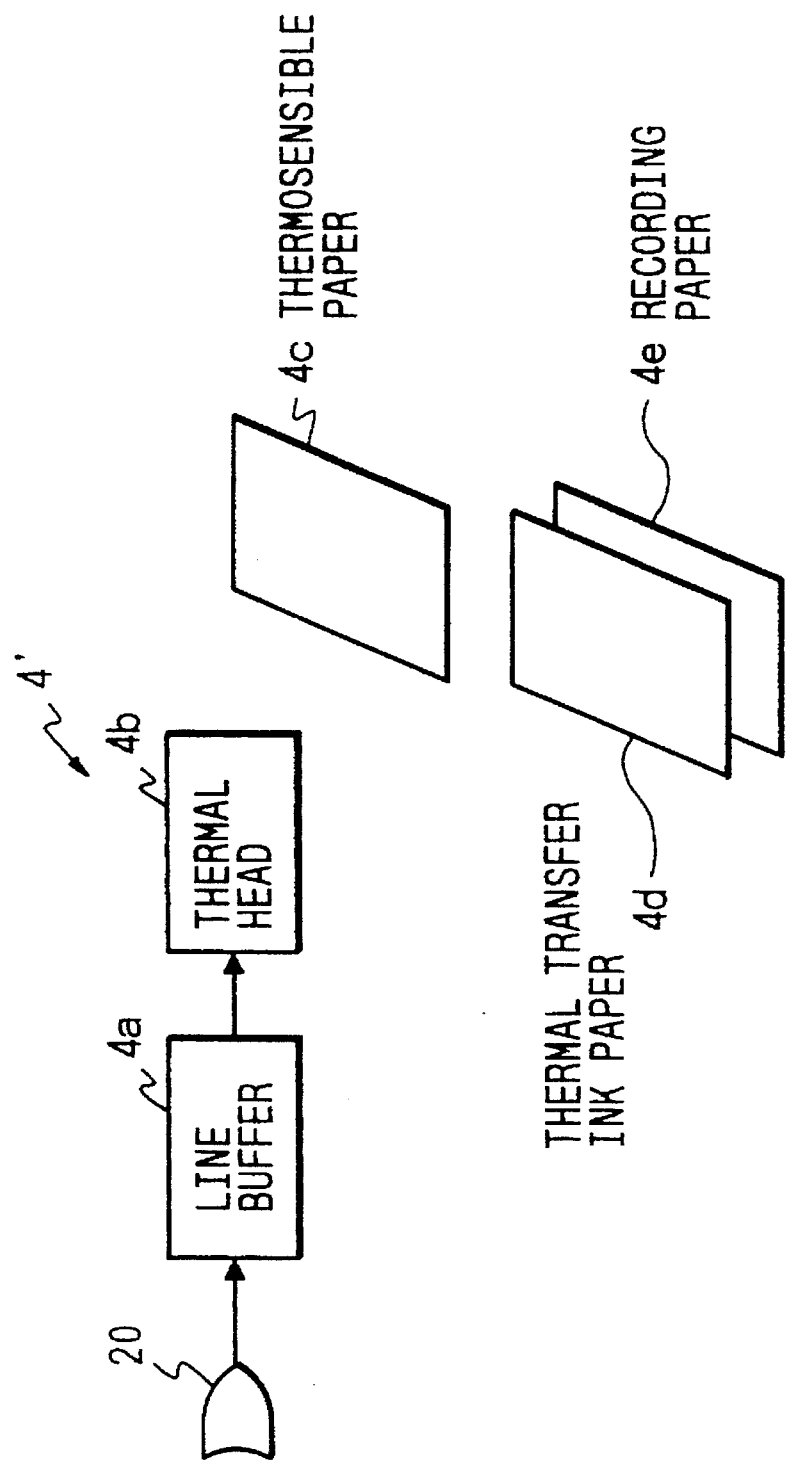
FIG. 19 is a block diagram of a modified embodiment of a thermal printer.

The image forming unit comprises a laser diode in this invention. However, this invention can be applied to dot matrix printers. Therefore, as shown FIG. 19, a thermal printer can be used. FIG. 19 is a block diagram of a modified embodiment of a thermal printer 4'. The thermal printer 4' comprises a line buffer 4a storing the laser drive signal and a thermal head 4b. The line buffer stores two line data of the laser drive signal. The thermal head 4b receives one line data of the laser drive signal and generates a thermal image which is developed on the thermosensible paper 4c which is fed by a feeding mechanism (not shown). In place of the thermosenslble paper 4c, a recording paper 4e can be used with a thermal-transfer-ink paper 4d.

Hereinbelow will be described a second embodiment of this invention.

Figure 20:
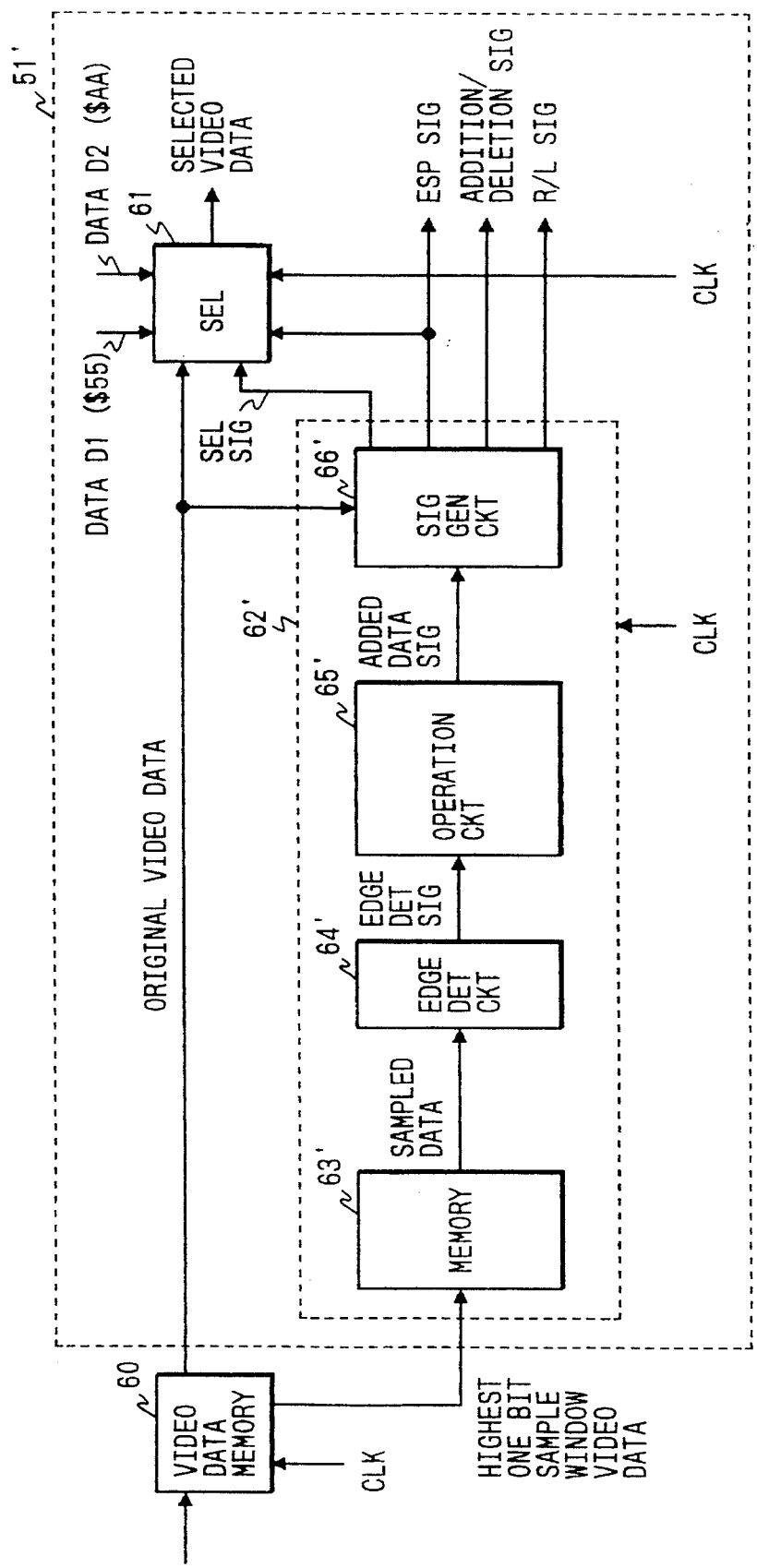
FIG. 20 is a block diagram of the second embodiment for showing structure of an edge smoothing signal generation circuit shown in FIG. 1.

FIG. 20 is a block diagram of the second embodiment for showing structure of an edge smoothing signal generation circuit 51'. The basic structure of the second embodiment is the same as the first embodiment. Difference of the second embodiment from the first embodiment in that the ESP circuit 62' deals with one bit video signal. That is, the memory 63' receives only the highest one bit of the video data read from the video data memory 60. Moreover, the ESP signal is set to the ESP condition when the original video data is the highlight or shadow level.

The edge smoothing signal generation circuit 51' comprises a memory 63' for storing a highest one bit of sample window video data of a predetermined area in responsive to the clock signal to form a sample window and for supplying stored video data as sampled data to an edge detection circuit 64', the edge detection circuit 64' for detecting edges in accordance with the sampled data to supply four directional edge detection signals to an operation circuit 65', the operation circuit 65' for adding times of detected edges regarding the four directions to supply added four directional data signals to a signal generation circuit 66' for generating the selection signal and an ESP judgement signal, the addition/ deletion signal, and the R/L signal in accordance with the added four directional data signals and the original video data, and a selector 61 for selecting either of the original video data, data D1 ($55), or data D2 ($AA) in response to the selection signal and the ESP signal.

The memory 63' receives the highest bit of the video data memory 60 to form the sample window as similar to the first embodiment. The edge detection circuit 64 detects the presence and absence of edges as similarly to the first embodiment with the sampled data having the highest bit data. The operation circuit 65' detects upward edges, downward edges, leftward edge, and rightward edges with respect to the center pixel and added the number of the detections of respective direction edges as similar to the first embodiment.

The operation circuit 65' supplies added upward edge data, added downward edge data, and added leftward edge data, added rightward edge data to the signal generation circuit 66'.

The signal generation circuit 66' judges whether or not the center pixel includes an edge in accordance with the added data of respective directions to determine the edge smoothing processing. The larger the added data the larger degree of existence of an edge in the direction of the added data.

In this embodiment. there are two degrees of addition of a small dot or deletion of a dot also, that is, one third of a full (100%) dot and two thirds of a full dot. Therefore, when one third dot is added or one third part of a dot is deleted, data D1 ($55) is outputted from the selector 61' in place of the original video data. When a two third dot is added or two third parts of a dot is deleted, data D2 ($AA) is outputted from the selector 61 in place of the original video data.

Figure 21:
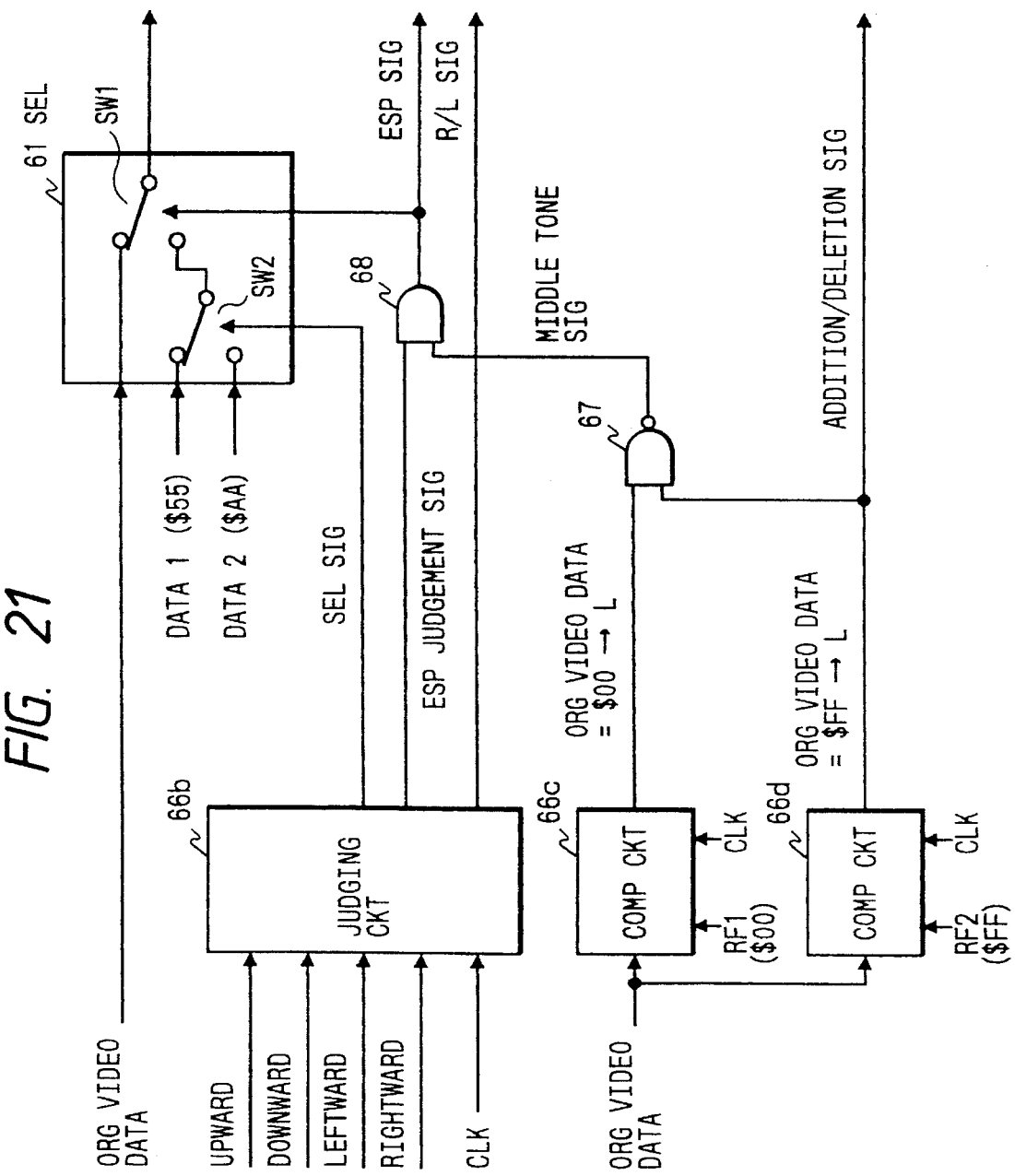
FIG. 21 is a block diagram of the second embodiment for showing structure of the signal generation circuit shown in FIG. 20.

FIG. 21 is a block diagram of the second embodiment for showing structure of the signal generation circuit 66' shown in FIG. 20. The signal generation circuit 66' comprises a comparing circuit 66c for comparing the original video data with the reference value RF1 ($00) to determine whether the video data at the center pixel is highlight or not highlight to produce a highlight signal which is L if the original video data indicates highlight, a comparing circuit 66d for comparing the original video data with the reference value RF2 ($FF) to determine whether the center pixel is shadow or not shadow to produce the addition/deletion signal which is L if the original video data indicates a shadow level, a judging circuit 66b responsive to the added upward edge data, the added downward edge data, the added leftward edge data, and the added rightward data for judging whether or not the edge smoothing should be effected, whether a small dot is added to the left side or the right side of the center pixel or which part of the dot of the center pixel is deleted, and which size of a dot should be added or deleted between ⅓ dot and ⅔ dot, a NAND gate 67 for generating a middle tone signal indicating that the original video data is the highlight level ($00) or the shadow level ($FF) and is in the middle tone range, and an AND gate 68 for effecting AND operation of the result of judging of the edge smoothing from the judging circuit 66b and the middle tone signal to produce the ESP signal.

The comparing circuit 66d compares the original video data with the reference value RF2 ($FF) to determine whether addition or deletion should be effected to generate the addition/deletion signal. If the original video data (center pixel) indicate a highlight and an edge is detected, a small dot is added to smooth an edge by making the addition/deletion signal H level. If the original video data shows a shadow level, the dot of the center pixel is partially deleted to smooth an edge by making the addition/deletion signal L level. The addition/deletion signal is outputted in response to the clock signal.

Degrees of addition and deletion of a dot depend on the values of the added upward edge data, the added downward edge data, the added rightward edge data, and the added leftward edge data. The larger the added edged data, the larger the degree of edge. In this embodiment, if the degree of an edge is large a large dot, that is, a two-third dot is added or two thirds parts of a dot is deleted. More specifically, if the added edge data is larger than five, a two-third dot is added or two third parts of the dot are deleted. If the added edge data is not larger than five, a one third dot is added or one third part of the dot is deleted. The timing of addition of a dot or deletion of a dot is provided with predetermined values compared with the reference signal and the clock signal. That is, the comparing circuit 3 is used as a timer means by comparing the predetermined value with the reference signal.

The judging circuit 66b judges the added upward edge data, the added downward edge data, the added rightward edge data, the added leftward edge data to produce the selection signal, an ESP judgement signal, the R/L signal in accordance with the flow chart as shown in FIG. 11 in the similar to the first embodiment. However, in steps S8 and S12, the setting.of logic level is effected for the ESP judgement signal in place of the ESP signal. Moreover, in step S13, the ESP judgement signal is outputted in place of the ESP signal.

This processing is carried out by a microprocessor. However, this is only example and if such an operation is carried out by a discrete electronic circuit, the processing speed will be increased.

Moreover, the ESP signal generation circuit 62' is only example. If the ESP judgement signal, the addition/deletion signal, the R/L signal are provided from other edge detection circuit, the image formation with edge smoothing can be provided by the image forming apparatus of this invention also. That is, the edge detection method for smoothing the edge setration is shown in U.S. Pat. No. 4,847,641, the disclosure of which is hereby incorporated by reference. Moreover, the edge detection method is shown in U.S. patent application Ser. No. 07/864,769, the disclosure of which is hereby incorporated by reference.

More specifically, these disclosures teach methods of detection of edge (ESP signal), determination of addition or deletion of a dot (addition/deletion signal), and direction of the detected edge (R/L signal). Therefore, the ESP judgement signal, the addition/deletion signal, and the R/L signal can be generated by these methods and are applied to the selection circuit and the laser drive signal generation circuit 52. The selection signal can be replaced with the ESP signal when the number of steps of deletion or addition of a dot is one.

The NAND gate 67 detects whether the original video data is the highlight or the shadow level or is a middle tone level. When the original video data is the high light or the shadow level, the middle tone signal is H, so that the AND gate 68 is enabled. Therefore, in this condition, the ESP signal is set to H and supplied to the laser drive signal generation circuit 52 in response to ESP judgement signal from the judging circuit 66b. When the original video data is a middle tone level, the middle tone signal is L, so that the AND gate 68 is disabled. Therefore, in this condition, the ESP signal is set to L and supplied to the laser drive signal generation circuit 52 in response to ESP judgement signal from the judging circuit 66b. That is, the ESP circuit 62' causes the laser drive signal generation circuit 52 to add or delete a dot only when the original video data is the highlight or the shadow level. In other words, when the original video data is a middle tone level, the edge smoothing is not effected. Since the middle tone level of the original data is removed from the target of the edge smoothing, the ESP circuit 62' may deal only one bit of video data, namely, the highest one bit data. This edge smoothing is provided for a continuous tone image including letters or markers having sharp edges. If a letter has a shadow level or high light of a primary color or black color, the edge smoothing is effected. If the video signal levels of the letters or markers are set to a more shadow or more highlight level than the continuous tone image, a more accurate operation is provided.

What is claimed is:

1. An image forming apparatus for forming an image, comprising:

(a) dot forming means responsive to a drive signal for forming a dot on a pixel when said drive signal indicates forming of said dot;

(b) first drive signal generation means for generating a first drive signal, having;
pulse width modulation means including:
a digital to analog converter for converting a video density signal into an analog video density signal;
first signal generation means for generating a reference sawtooth signal in phase with a clock signal which is in phase with said video density signal; and
comparing means for comparing said analog video density signal with said reference sawtooth signal to generate said first drive signal;
(c) second drive signal generation means for generating a second drive signal, having:
first inverting means for inverting said first drive signal;
second inverting means for inverting said clock signal;
second signal generation means for generating first to fourth signals in accordance with said clock signal, said first drive signal, said inverted clock signal, and said inverted first drive signal; and
first selection means for selecting and supplying either of said first to third signals as said second drive signal in accordance with an addition/deletion signal and a directional signal; and
(d) second selection means for selecting and supplying said first drive signal as said drive signal to said dot forming means when an edge smoothing signal indicates a non-smoothing mode and for supplying said second drive signal as said drive signal to said dot forming means when said edge smoothing signal indicates a soothing mode, said edge smoothing signal indicating addition and deletion of said dot, a deletion mode of said addition/deletion signal indicating that said video density signal of said pixel shows a shadow level and there is a first edge adjacent to said pixel in a first image indicated by said video density signal, an addition mode of said addition/deletion signal indicating that said video density signal of said pixel shows a highlight level and there is a second edge adjacent to said pixel in a second image indicated by said video density signal, said directional signal indicating a direction of said first and second edges from said pixel.

2. An image forming apparatus as claimed in claim 1, wherein said second signal generation means comprises:
(a) a first OR gate for effecting OR operation between said inverted clock signal and said first drive signal to generate said first signal;
(b) a first AND gate for effecting AND operation between said clock signal and said inverted first drive signal to generate said second signal;
(c) a second OR gate for effecting OR operation between said first drive signal and said clock signal to generate said third signal; and
(d) a second AND gate for effecting AND operation between said inverted clock signal and said inverted first drive signal to generate said fourth signal.

3. An image forming apparatus for forming a halftone image comprising:
(a) dot forming means responsive to a drive signal for forming a dot on a pixel to forming said halftone image;
(b) first signal generation means responsive to a video density signal for generating a pulse width modulated signal in accordance with a video density signal;
(c) second signal generation means for generating a first dot signal having a first pulse of which width is smaller than a period of said pixel when a deletion signal indicates a deletion mode such that said first pulse is shifted within said period of said pixel in accordance with a directional signal;
(d) third signal generation means for generating a second dot signal having a second pulse of which width is smaller than a period of said first pulse when an addition signal indicates an addition mode such that said second pulse is shifted within said period of said pixel in accordance with a directional signal; and
(e) selection means for supplying said pulse width modulated signal as said drive signal when said deletion signal indicates a non-deletion mode and said addition signal indicates a non-addition mode, for supplying said first dot signal as said drive signal in said deletion mode, and for supplying said second dot signal as said drive signal in said addition mode, said addition signal indicating that said video density signal of said pixel shows a highlight level and there is a second edge adjacent to said pixel in a second image indicated by said video density signal, said directional signal indicating a direction of said first and second edges from said pixel.

4. An image forming apparatus as claimed in claim 3, wherein said second signal generation means shifts said first pulse in the direction opposite to said second pulse.

5. An image forming apparatus for forming an image comprising:
(a) dot forming means responsive to a drive signal for forming a dot on a pixel when said drive signal indicates forming said dot;
(b) first drive signal generation means for generating a first drive signal pulse-modulated with a video density signal;
(c) edge detection means for generating a deletion signal, an addition signal, and a directional signal, said deletion signal indicating that said video density signal of said pixel shows a shadow level and there is a first edge adjacent to said pixel in a first image indicated by said video density signal, said addition signal indicating that said video density signal of said pixel shows a highlight level and there is a second edge adjacent to said pixel in a second image indicated by said video density signal, said directional signal indicating directions of said first and second edges from said pixel; and
(d) second drive signal generation means for generating a second drive signal to form a second dot smaller than said pixel in response to said deletion signal of which position is determined in accordance with said directional signal and for generating a third drive signal to form a third dot smaller than said second dot in response to said addition signal of which position is determined in accordance with said directional signal; and
(e) selection means for selecting and supplying said first drive signal to said dot forming means as said drive signal in the absence of said addition and deletion signals, for selecting and supplying said second drive signal to said dot forming means as said drive signal in the presence of said deletion signal, and for selecting and supplying said third drive signal to said dot forming means as said drive signal in the presence of said addition signal.

6. An image forming apparatus as claimed in claim 5, wherein said dot forming means comprises a laser diode for emitting a laser beam in response to said drive signal and scanning means for scanning said laser beam.

7. An image forming apparatus as claimed in claim 5, wherein said dot forming means comprises a thermal head for forming said dot on a thermosensible paper in response to said drive signal.

8. An image forming apparatus as claimed in claim 5, wherein said dot forming means comprises a thermal head for forming said dot as a thermal image in response to said drive signal and thermal image transferring means for transferring said thermal image to a recording paper.

* * * * *